(12) United States Patent
Cheaz et al.

(10) Patent No.: US 10,218,773 B2
(45) Date of Patent: Feb. 26, 2019

(54) SCREEN RECORDING OF ACTIONS THAT INITIATED A FILE DOWNLOAD

(71) Applicant: International Business Machines Corporation, Armonk, NY (US)

(72) Inventors: Nixon Cheaz, Cary, NC (US); Anthony M. Diaz, Durham, NC (US); Michael E. Head, Cary, NC (US); Jordana H. Kerr, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/434,768

(22) Filed: Feb. 16, 2017

(65) Prior Publication Data

US 2018/0234482 A1    Aug. 16, 2018

(51) Int. Cl.
*H04L 29/08*    (2006.01)
*G06F 15/16*    (2006.01)

(52) U.S. Cl.
CPC .......... *H04L 67/06* (2013.01); *H04L 67/1097* (2013.01)

(58) Field of Classification Search
USPC ....................................................... 709/219
See application file for complete search history.

(56) References Cited

U.S. PATENT DOCUMENTS

| | | | |
|---|---|---|---|
| 6,955,536 B1 * | 10/2005 | Buchanan | A61C 1/0015 433/27 |
| 8,838,625 B2 | 9/2014 | Xu et al. | |
| 8,904,473 B2 | 12/2014 | Sambamurthy et al. | |
| 8,984,408 B2 * | 3/2015 | Sugaya | H04L 69/24 715/734 |
| 2009/0144826 A2 | 6/2009 | Piccard | |
| 2012/0302167 A1 * | 11/2012 | Yun | G06F 3/04883 455/41.2 |
| 2013/0191774 A1 | 7/2013 | Choi et al. | |

OTHER PUBLICATIONS https://web.archive.org/web/201605080704114/http://windows.microsoft, printed Jul. 20, 2016, pp. 1-2.
https://grok.isu.edu/Article.aspx?articleid=4521, printed Jul. 20, 2016, pp. 1-2.
https://wikipedeia.org/w/index.php?title=Extended_file_attributes, printed Jul. 20, 2016, pp. 1-3.
https://chrome.google.com/webstroe/detail/chrome-downloads/mhaaapflafeapcmgbphlmealldkomfbe, printed Jul. 20, 2016, pp. 1-7.
Marlin, J. "Alternate Data Streams in NTFS", https://blogs.tehnet.microsoft.com/askcore/2013/03/24/alternative-data, Mar. 24, 2013, pp. 1-7.

\* cited by examiner

*Primary Examiner* — Jude Jean Gilles
(74) *Attorney, Agent, or Firm* — Scully, Scott, Murphy & Presser, P.C.; Nicholas Bowman, Esq.

(57) ABSTRACT

In an aspect of the present disclosure, a method for capturing a context of a file download or modification is disclosed. The method includes designating a file storage location for monitoring, capturing a continuous stream of display data, monitoring the designated file storage location for the download of a new data file to the file storage location or the modification of an existing data file stored in the file storage location, determining that a download of a new data file or modification of an existing data file has been initiated, storing the new data file or the modification to the existing data file in the file storage location, storing the captured display data as file display data, and creating a correspondence between the file display data and the stored new data file or modified existing data file.

20 Claims, 4 Drawing Sheets

SCREEN RECORDING OF ACTIONS THAT INITIATED A FILE DOWNLOAD

BACKGROUND

Computers allow users to download or receive data files from a variety of sources. For example, a user can access a web site using a web browser and download a data file associated with the web site from the web site. In another example, a user may utilize a file sharing program such as a File Transfer Protocol (FTP), Secure copy (SCP), or other third party download managers to download or receive a data file.

Downloaded files are often saved or stored in memory on the computer. For example, the memory may include a directory that is designated to receive and store downloaded data files, e.g., a download directory. In some instances, the user may specify a different storage location for the downloaded data file at the time of download. Each data file typically includes a file name or designator that uniquely identifies the file within the directory or storage location.

As the user downloads additional data files, the user's download directory (or storage location) may become crowded with data files. In some cases, some or all of the downloaded data files may have similar file names, sequential file names, or even non-semantic file names which may be difficult to decipher or differentiate. In addition, data files having similar file names can come from different download sources and as the volume of data files in the directory (or other storage location) increases, it may become almost impossible for a user to tell the difference between individual files just by looking at the file name of the data file.

Existing technologies such as web browsers or download managers often attempt to track the download of data files by keeping a record of the Uniform Resource Locator (URL) the data file was downloaded from and the date/time of the download. For example, the Google Chrome® web browser provided by Google® includes functionality such as Chrome Downloads™ that tracks the URL of downloads. Web browsers such as Edge® provided by Microsoft® and Firefox® provided by Mozilla® also provide download managers. Although this information may be useful in many cases, often the user may require more information about the downloaded data file than the URL of the data file to know what the data file is. In addition, in cases where the data file was not downloaded using a web browser, such URL tracking may not be available.

BRIEF SUMMARY

The system, method, and computer program product described herein provide for the capture of a context of a file download or modification for later playback by a user.

In an aspect of the present disclosure, a method for capturing a context of a file download or modification is disclosed. The method includes designating, in memory associated with at least one hardware processor, a file storage location for monitoring and capturing a continuous stream of display data, the display data comprising data that is configured for presentation on a display. The method further includes monitoring the designated file storage location for the download of a new data file to the file storage location or the modification of an existing data file stored in the file storage location, determining that a download of a new data file or modification of an existing data file has been initiated, storing the new data file or the modification to the existing data file in the file storage location, storing the captured display data as file display data, and creating a correspondence between the file display data and the stored new data file or modified existing data file.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides methods and systems to capture the context of a data file download for later playback by a user in a seamless and secure manner.

Figure 1:
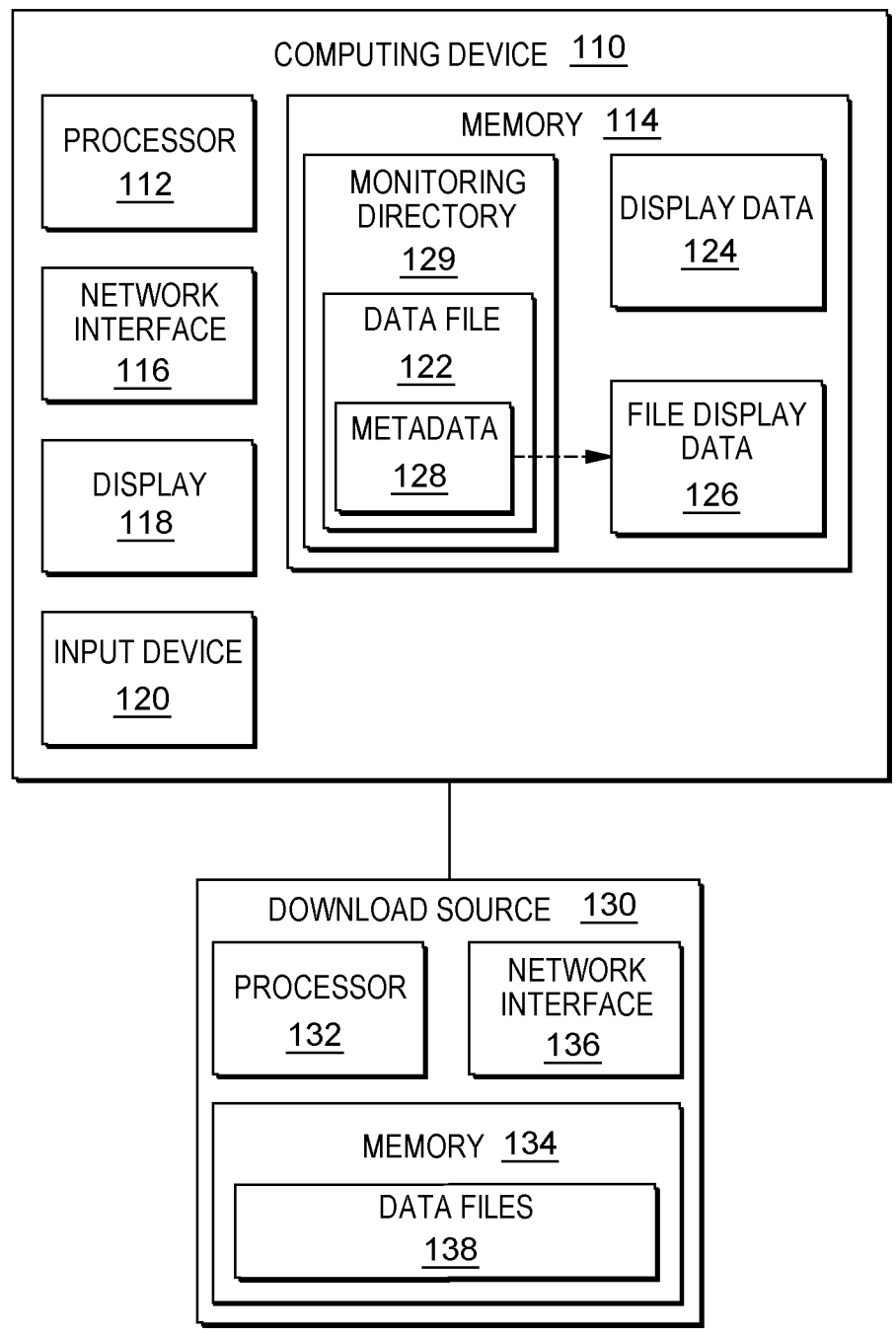
FIG. 1 is a system diagram illustrating a system for the capture and playback of the context surrounding a file download in accordance with an aspect of the present disclosure.

With reference now to FIG. 1, a system 100 for tracking and recording the context of a data file download is illustrated. In some aspects, system 100 includes a computing device 110, and a download source 130.

Computing device 110 includes a processor 112, memory 114, network interface 116, display 118, input device 120, and any other features common to a computing device. In some aspects, computing device 110 may, for example, be any computing device that is configured to download and store file data from a data source 130. In some aspects, computing device 110 may include, for example, personal computers, laptops, tablets, smart devices, smart phones, smart wearable devices, smart watches, or any other similar computing device.

Processor 112 may include, for example, a microcontroller, Field Programmable Gate Array (FPGA), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 710 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Memory 114 may be configured to store data files 122 received or downloaded from one or more download sources 130. In some aspects, for example, some or all of memory 114 may be formatted as a New Technology File System (NTFS) configured to use alternate data streams (ADS) and extended file attributes. In some aspects, memory 114 may be configured to allow the association of meta-data type information with data files 122 stored in memory 114.

Network interface 116 is configured to transmit and receive data or information to and from a data source 130 via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data source 130.

Display 118 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 118 may include a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display, a keypad, a microphone, or other similar input devices or any other input devices that may be used alone or together to provide a user with the capability to interact with computing device 110.

Download source 130 includes a processor 132, memory 134, and a network interface 136 that may include similar functionality as processor 112, memory 114, and network interface 116. In some aspects, download source 130 may, for example, be any computing device, server, database, or similar system that is configured to store, forward, or otherwise manage the distribution or transmission of data files 138 to computing device 110. In some aspects, download source 130 may include, for example, a web server, a remote storage system, a cloud storage system, or other similar data storage systems. In some aspects, download source 130 may act as an intermediary between the computing device 110 and memory 134 where, for example, memory 134 may be located remotely from download source 130. For example, download source 130 may be a web server hosting a web site that the computing device 110 of the user may access. When the user requests to download a data file 138 from the web site, e.g., by activating a download link on the web site using input device 120, download source 130 may submit the request to the remote memory 134, and the data file 138 may be provided or transmitted to the computing device 110 either directly from the remote memory 134 or via download source 130.

In some aspects, computing device 110 may be configured to monitor display data 124 that is output to display 118 for presentation to the user and may capture the monitored display data 124 in memory 114. For example, in some aspects, during a user session, processor 112 may continuously monitor a stream of display data 124 that is output to display 118 and may temporarily or permanently store the streaming display data 124 in memory 114 for later use. In some aspects, for example, the streaming display data 124 may be store temporarily in a buffer in memory 114. For example, the streaming display data 124 may be stored in memory 114 for a pre-determined period of time before being deleted or overwritten, e.g., a pre-determined number of seconds, minutes, or other units of time. In some aspects, the amount of time that the streaming display data 124 is stored in the buffer may be determined based on the size of the buffer. For example, as the buffer fills up, any new streaming display data 124 may overwrite the oldest display data 124 already stored in the buffer. In some aspects, the buffer size or pre-determined period of time may be defined, for example, by the computing device in advance, by user input, or in any other manner. In some aspects, the pre-determined period of time, or the buffer size, should be sufficient to allow for the capture and storage of a portion of the streaming display data 124 prior to the download and saving as a data file 122 of one or more data files 138 from download source 130 by the user via input device 120 or prior to the modification of an existing data file 122 by the user. For example, the pre-determined period of time, or the buffer size, should be sufficient to allow for the permanent or semi-permanent capture of the display data 124 as displayed on display 118 in the time leading up to the user's download or modification of a data file 122. For example, the pre-determined period of time, or the buffer size, may be sufficient to allow for the permanent or semi-permanent capture and storage of the last 30 seconds of display data 124 that is output to display 118 directly prior to the user's download or modification of a data file 122. In some aspects, display data 124 may be post processed to maximize compression and lower frame rate in an effort to reduce a storage size of the display data 124.

In some aspects, after a user downloads or modifies a data file 122, computing device 110 may continue to store the monitored display data 124 in memory 114 or a buffer for a pre-determined period of time after the download or modification, e.g., 30 seconds or any other amount of time.

In some aspects, for example, the buffered or stored display data 124 prior to download or modification may be combined with the display data 124 captured after the download or modification to create file display data 126 that shows a full context surrounding the user's actions before, during, and after the user's download or modification of a data file 122. For example, the file display data 126 may include the display data 124 captured directly before, during, and after the file download. For example, the file display data 126 may include display data 124 captured in the pre-determined period of time before the download or modification, e.g., 3 seconds, 5 seconds, 30 seconds, or any other amount of time, display data 124 of the download or modification itself, and display data 124 captured after the download or modification, e.g., for a pre-determined period of time after the download or modification or after the file download has completed, e.g., 3 seconds, 5 seconds, 30 seconds, or any other amount of time. In some aspects, the file display data 126 may be stored in a separate memory location in memory 114 for later use and permanent or semi-permanent storage.

In some aspects, the file display data 126 captured prior to, during, and after the download or modification represents a context of both where the data file 122 comes from or how the data file 122 was modified and how the user saved the downloaded data file 122. For example, the file display data 126 may show the steps performed by the user to select the data file for download, e.g., what part of what web page was activated to download the file, where on the web page the download link to the file was found, what program was used to download the file (web page, File Transfer Protocol (FTP), Secure Copy (SCP), third party download managers, torrents, etc.), and other contexts related to how the user found the file for download. In some aspects, for example, the file display data 126 may show other programs that were open at the time to provide context for the download, e.g., what program prompted the user to download the file, whether the downloaded file is related to a particular program, or other similar contexts. In some aspects, for example, the file display data 126 may show the steps taken by the user to download of the data file 122, e.g., whether the user changed the file name, what location the user selected for the download, what file format the user selected, etc. In some aspects, for example, the file display data 126 may show what actions the user took to modify an existing data file 122, for example, relocating the file from an original download location, renaming the file in the download location, executing the file, or other similar actions.

In some aspects, metadata 128 may be associated with each data file 122. For example, the metadata 128 may be appended or attached to the data file 122, associated with the data file 122 by a file manager, or in any other manner. For example, metadata 128 may be an extended file attribute of the data file 122 beyond the basic date of modification/creation, permissions, ownership, or other similar attributes that are commonly associated with a data file 122 by an operating system. In some aspects, metadata 128 may be verified to ensure that it is authentic. For example, metadata 128 may be checked to ensure that checksums or signatures on the metadata have not been tampered with. In some aspects, for example, a SHA 256 checksum, a PM digital signature, or any other method of verifying the content of a file may be used.

In some aspects, metadata 128 may capture file origin specific meta data that provides a unique identifier to tie up the data file 122 to the corresponding screen recording. For example, the metadata 128 may include a link to the file display data 126 corresponding to the data file 122 so that the user may play back the file display data 126 at a later time to determine the context of the file download or modification. In some aspects, metadata 128 may include an origin identifier, for example, a source of the file such as USB thumb drive, CD ROM, download URL, or other similar sources. In some aspects, metadata 128 may include file modification data that may capture how many times the file has been modified since it was downloaded and at what time/date these changes happened.

In some aspects, the metadata 128 and file display data 126 corresponding to the data file 122 may be secured, guarded, or encrypted by user authentication, for example, user access controls, or other similar authentication systems that require user credentials or login for access. This may prevent or inhibit users of the data file 122 other than the user that downloaded or modified the data file 122 from playing back the file display data 126 corresponding to the data file 122. In some aspects, file display data 126 may be associated with data file 122 in a manner that does not use metadata, for example, by a file manager of the computing device 110. For example, computing device 110 may maintain a database or table of data files 122 and corresponding file display data 126 to allow a user to access the corresponding file display data 126 for each data file 122.

In some aspects, the capture of display data 124 and the association with a data file 122 as file display data 126 may require coordination between a file manager of computing device 110, an operating system network stack of computing device 110, authentication or authorization components of the computing device 110, and the file system of the computing device 110.

In some aspects, for example, this coordination may be accomplished by designating a monitoring file storage location or directory 129 in memory 114 of the computing device 110 to be monitored for downloaded or modified data files 122, e.g., a download directory. This designation may be accomplished through the use of the operating system of computing device 110, for example, by setting an option in a control panel of the operating system. For example, a user may designate a particular folder or directory 129 as a directory to be monitored, e.g., a "download" directory. The monitoring director 129 may be set up as the default location for saving downloaded files when the user initiates a file download. In some aspects, the operating system of computing device 110 may initially designate a default directory 129 to be monitored for receiving downloaded files without the need for further user input. The designated directory 129 may then be monitored for new file downloads or file modifications.

The current user activity may be recorded as described above using real-time screen capture on video as display data 124. As mentioned above, in some aspects, the screen recording may be continuous with any display data 124 that is not surrounding a file download or modification being discarded. In some aspects, all screen recording display data 124 and file display data 126 may be securely encrypted, e.g., via operating system level authentication/authorization, to ensure that the recorded user activities are not accessible to parties other than the user. In some aspects, the display data 124 or file display data 126 may alternatively be accessible to any user that has been authenticated or authorized to view the display data, e.g., a IT administrator or other individual having authorization to view the user's activities.

Figure 2:
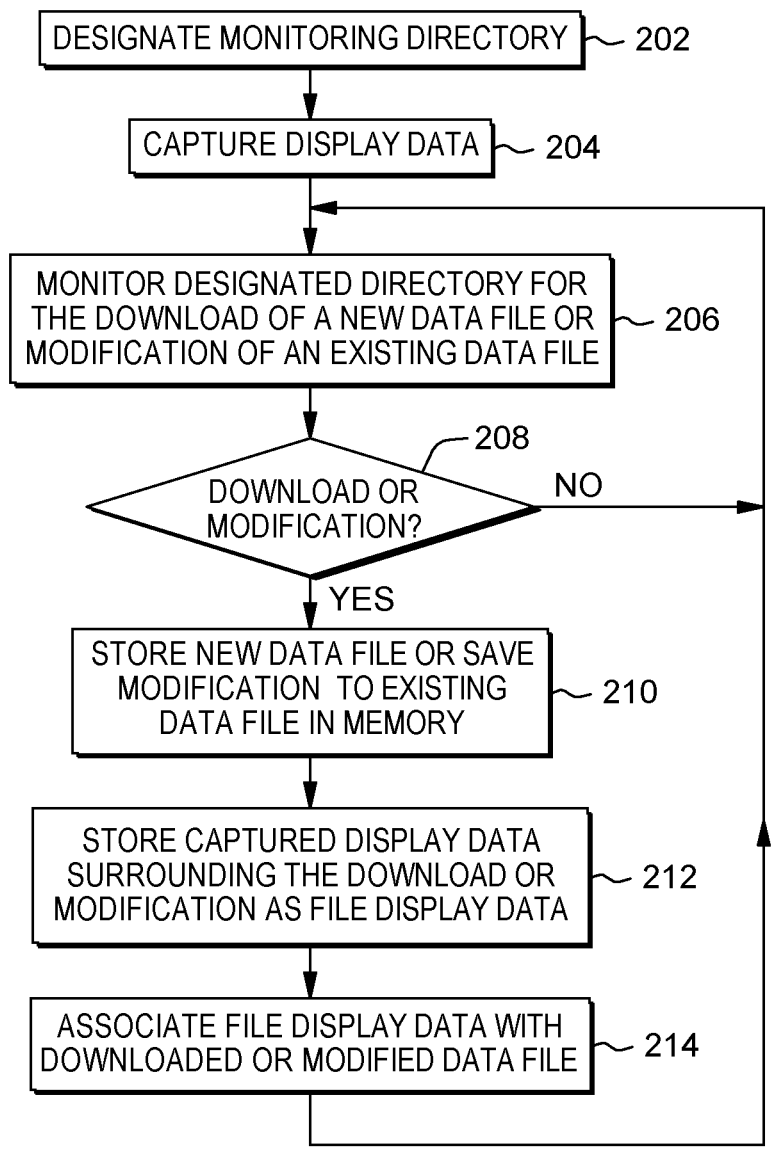
FIG. 2 is a flow chart of a method for capturing a context of a file download according to an embodiment of the present disclosure.

With reference now to FIG. 2, a method 200 for capturing a context of a file download is disclosed.

At 202, a user or computing device 110 may designate a monitoring directory 129 to be monitored for the download or modification of files.

At 204, computing device 110 captures a continuous stream of display data 124 that is presented to the user via display 118. In some aspects, for example, a low framerate video stream may be captured by periodically capturing data directly from a video frame buffer in a video card of computing device 110.

At 206, computing device 110 monitors the designated monitoring directory 129 for the download of a data file 122 to the designated monitoring directory 129, e.g., a data file 138 from download source 130, or the modification of an existing data file 122 in the designated monitoring directory 129 by the user. For example, computing device 110 may monitor directory 129 for the download of a data file 138 from download source 130 which is saved to monitoring directory 129 as a data file 122.

At 208, computing device 110 determines whether there has been a download or a modification of a data file. If no download or modification has been detected, the method returns to 206 and computing device 110 continues to monitor the directory for a download or a modification of a data file 122.

At 210, if a download or modification is detected by computing device 110, the data file 138 is stored in monitoring directory 129 of memory 114 as a data file 122, or the modification to an existing data file 122 (e.g., name change, relocation to another folder, etc.) is saved.

At 212, the captured display data 124 surrounding the download or modification is stored as file display data 126. For example, the display data 124 stored in memory 114 that was captured prior to the download or modification and the display data 124 captured during and directly after the download or modification may be stored as file display data 126 in memory. In some aspects, the entire buffer of stored display data 124 prior to the download or modification may be stored in the file display data 126. In some aspects, only a pre-determined portion of the display data 124 may be stored in file display data 126. For example, the display data 124 from a pre-determined period of time before, during, and after the download or modification may be stored as file display data 126. In some aspects, a predetermined size of display data 124 from before, during, and after the download or modification may be stored as file display data 126, e.g., the last megabyte of display data 124 captured directly prior to the download or modification, the display data 124 captured during the download or modification, and the megabyte of display data 124 captured after the download or modification has completed. Any other size or pre-determined period of time may be used so long as a context of the download or modification is captured for playback.

At 214, the stored file display data 126 is associated with the downloaded or modified data file 122. For example, metadata associated with the data file 122 may include a reference to the corresponding file display data 126 that provides a context of the download or modification.

Figure 3:
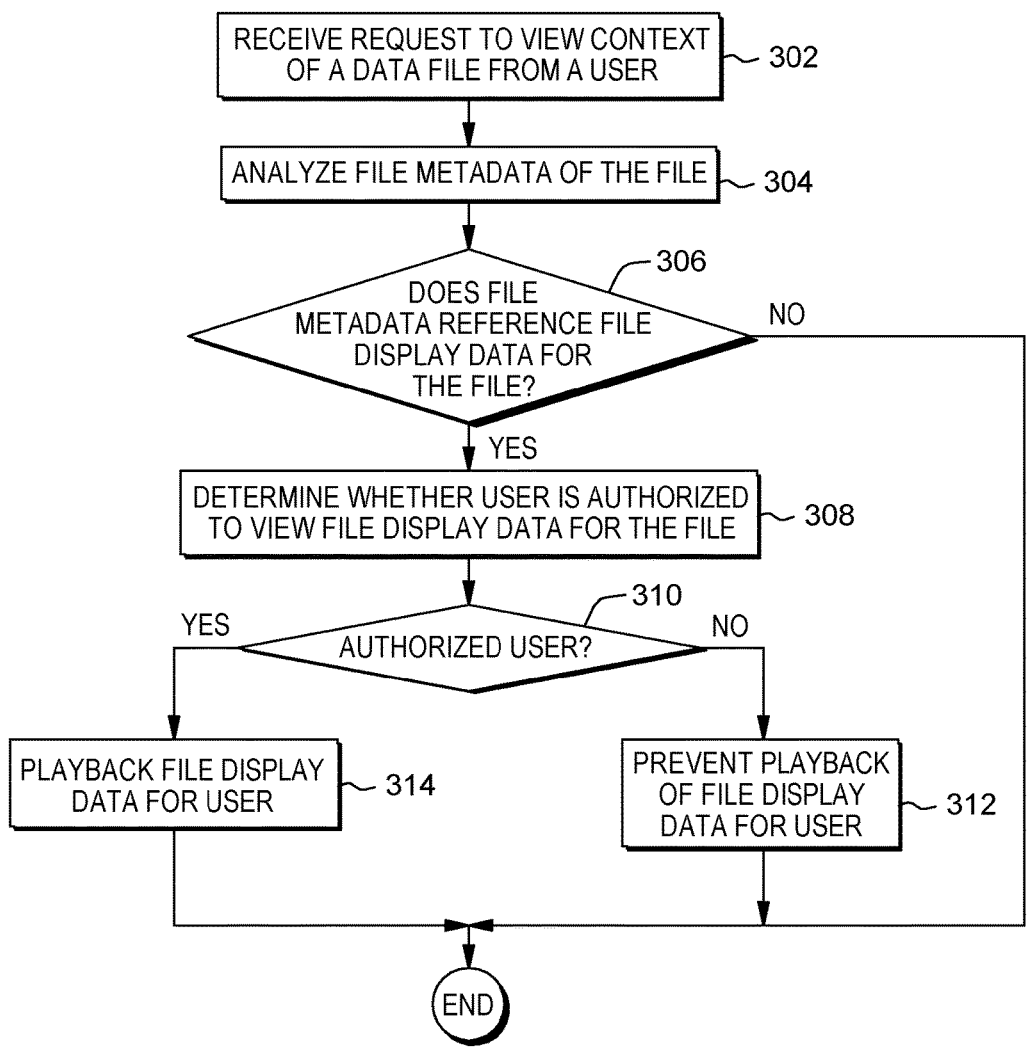
FIG. 3 is a flow chart of a method for playing back the captured context of a file download according to an embodiment of the present disclosure.

With reference now to FIG. 3, a method 300 for accessing the captured context of a downloaded file is disclosed. The file manager may allow the user to select the data file 122 that the user is interested in and may provide the user with a link or other activatable feature that activates file display data 126 corresponding to that data file 122 for playback based on the metadata 128 of the data file 122.

At 302, computing device 110 receives a request from a user to view the context of a data file 122. For example, the request may be received via input device 120. For example, in some aspects, the user may access monitoring directory 129 using a file manager of the operating system of computing device 110. The file manager may allow the user to select a data file 122 for viewing contextual playback.

At 304, the computing device 110 analyzes the metadata of the selected data file 122 and determines whether the metadata 128 references any file display data 126 that corresponds to the selected data file 122 at 306. If the computing device determines that the file metadata 128 does not reference a corresponding file display data 126 the method ends. If the computing device determines that the file metadata 128 references a corresponding file display data 126 for the selected data file 122, computing device 110 determines whether the user is authorized to view playback of the file display data 126 corresponding to the data file 122 at 308. For example, computing device 110 may check the user's login credentials or perform other authentication to determine whether the user is authorized to access playback of the file display data 126.

At 310, if the computing device 110 determines that the user is not authorized, playback of the data file 122 is prevented by computing device 110 at 312 and the method ends. If the computing device 110 determines that the user is authorized, the file display data 126 is played back for the user at 314. For example, the file display data 126 may be played back to the user via display 118.

Figure 4:
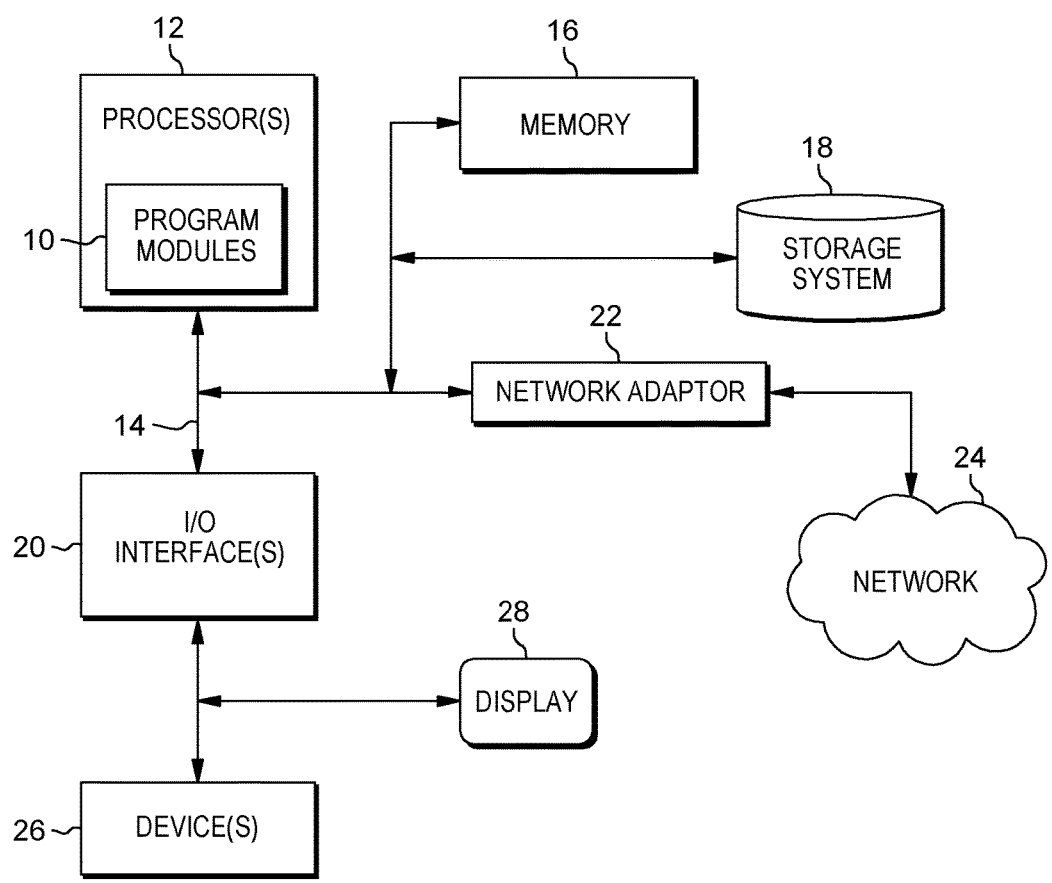
FIG. 4 is an exemplary block diagram of a computer system in which processes involved in the system, method, and computer program product described herein may be implemented.

FIG. 4 illustrates a schematic of an example computer or processing system that may implement any portion of computing device 110, download source 130, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor for capturing a context of a file download or modification, the method comprising:
    designating, in memory associated with at least one hardware processor, a file storage location for monitoring;
    capturing a continuous stream of display data, the display data comprising data that is configured for presentation on a display;
    monitoring the designated file storage location for a download of a new data file to the file storage location or a modification of an existing data file stored in the file storage location;
    determining that a download of a new data file or modification of an existing data file has been initiated;
    storing the new data file or the modification to the existing data file in the file storage location;
    storing the captured display data as file display data; and
    creating a correspondence between the file display data and the stored new data file or modified existing data file.

2. The method of claim 1, wherein the stored new data file or modified existing data file comprises metadata, the creating of the correspondence between of the file display data and the stored new data file or modified existing data file comprising:
    updating the metadata of the stored new data file or modified existing data file with a reference to the file display data.

3. The method of claim 2, further comprising:
    receiving a request to view a context of the stored new data file or modified existing data file from a user;
    in response to receiving the request, analyzing the metadata of the stored new data file or modified existing data file to determine the corresponding file display data; and
    playing back the file display data for the user on a display.

4. The method of claim 3, further comprising:
    performing authentication of the user to determine whether the user is authorized to view the file display data prior to playback of the file display data for the user on the display.

5. The method of claim 1, wherein storing the captured display data as file display data further comprises:
    storing the at least the portion of the continuous stream of display data captured before the download or modification has started as a first portion of the file display data;
    storing the continuous stream of display data captured during the download of the new data file or modification of the existing data file as a second portion of the file display data; and storing at least a portion of the continuous stream of display data captured after the download or modification is complete as a third portion of the file display data.

6. The method of claim 5, wherein:
the first portion of the file display data comprises streaming display data captured from a pre-determine period of time before the download or modification has started to a start of the download or modification; and
the third portion of the file display data comprises streaming display data captured after the download or modification has completed up to a pre-determined period of time after the download or modification has completed.

7. The method of claim 5, wherein at least a portion of the continuous stream of display data captured prior to a start of the download or modification is temporarily stored in a buffer.

8. A system comprising:
At least one hardware processor;
memory associated with the at least one hardware processor; and
a display associated with the at least one hardware processor,
the at least one hardware processor configured to:
designate, in the memory, a file storage location for monitoring;
capture a continuous stream of display data, the display data comprising data that is configured for presentation on the display;
monitor the designated file storage location for the download of a new data file to the file storage location or the modification of an existing data file stored in the file storage location;
determine that a download of a new data file or modification of an existing data file has been initiated;
store the new data file or the modification to the existing data file in the file storage location;
store the captured display data as file display data; and
create a correspondence between the file display data and the stored new data file or modified existing data file.

9. The system of claim 8, wherein the stored new data file or modified existing data file comprises metadata, the creating of the correspondence between of the file display data and the stored new data file or modified existing data file comprising:
updating the metadata of the stored new data file or modified existing data file with a reference to the file display data.

10. The system of claim 9, the at least one hardware processor further configured to:
receive a request to view a context of the stored new data file or modified existing data file from a user;
in response to receiving the request, analyze the metadata of the stored new data file or modified existing data file to determine the corresponding file display data; and
play back the file display data for the user on a display.

11. The system of claim 10, the at least one hardware processor further configured to:
perform authentication of the user to determine whether the user is authorized to view the file display data prior to playback of the file display data for the user on the display.

12. The system of claim 8, wherein storing the captured display data as file display data further comprises:

storing the at least the portion of the continuous stream of display data captured before the download or modification has started as a first portion of the file display data;
storing the continuous stream of display data captured during the download of the new data file or modification of the existing data file as a second portion of the file display data; and
storing at least a portion of the continuous stream of display data captured after the download or modification is complete as a third portion of the file display data.

13. The system of claim 12, wherein:
the first portion of the file display data comprises streaming display data captured from a pre-determine period of time before the download or modification has started to a start of the download or modification; and
the third portion of the file display data comprises streaming display data captured after the download or modification has completed up to a pre-determined period of time after the download or modification has completed.

14. The system of claim 12, wherein at least a portion of the continuous stream of display data captured prior to a start of the download or modification is temporarily stored in a buffer.

15. A non-transitory computer readable medium comprising instructions that, when executed by at least one hardware processor, configure the at least one hardware processor to:
Designate, in memory associated with the at least one hardware processor, a file storage location for monitoring;
capture a continuous stream of display data, the display data comprising data that is configured for presentation on a display;
monitor the designated file storage location for the download of a new data file to the file storage location or the modification of an existing data file stored in the file storage location;
determine that a download of a new data file or modification of an existing data file has been initiated;
store the new data file or the modification to the existing data file in the file storage location;
store the captured display data as file display data; and
create a correspondence between the file display data and the stored new data file or modified existing data file.

16. The non-transitory computer readable medium of claim 15, wherein the stored new data file or modified existing data file comprises metadata, the creating of the correspondence between of the file display data and the stored new data file or modified existing data file comprising:
updating the metadata of the stored new data file or modified existing data file with a reference to the file display data.

17. The non-transitory computer readable medium of claim 16, the at least one hardware processor further configured to:
receive a request to view a context of the stored new data file or modified existing data file from a user;
in response to receiving the request, analyze the metadata of the stored new data file or modified existing data file to determine the corresponding file display data; and
play back the file display data for the user on a display.

18. The non-transitory computer readable medium of claim 17, the at least one hardware processor further configured to:

perform authentication of the user to determine whether the user is authorized to view the file display data prior to playback of the file display data for the user on the display.

19. The non-transitory computer readable medium of claim 15, wherein storing the captured display data as file display data further comprises:
   storing the at least the portion of the continuous stream of display data captured before the download or modification has started as a first portion of the file display data;
   storing the continuous stream of display data captured during the download of the new data file or modification of the existing data file as a second portion of the file display data; and
   storing at least a portion of the continuous stream of display data captured after the download or modification is complete as a third portion of the file display data.

20. The non-transitory computer readable medium of claim 19, wherein:
   the first portion of the file display data comprises streaming display data captured from a pre-determine period of time before the download or modification has started to a start of the download or modification; and
   the third portion of the file display data comprises streaming display data captured after the download or modification has completed up to a pre-determined period of time after the download or modification has completed.

\* \* \* \* \*